United States Patent
Wei et al.

(10) Patent No.: US 7,576,954 B2
(45) Date of Patent: Aug. 18, 2009

(54) SYMMETRIC VOICE COIL MOTOR DESIGN, ASSEMBLY METHODS OF CONSTRUCTING SAME, AND HARD DISK MICRO DRIVE STORAGE SYSTEMS INCLUDING SAME

(75) Inventors: Liding Wei, DongGuan (CN); Yihua Pei, DongGuan (CN)

(73) Assignee: SAE Magnetics H.K. Ltd., Hong Kong (CN)

( * ) Notice: Subject to any disclaimer, the term of this patent is extended or adjusted under 35 U.S.C. 154(b) by 427 days.

(21) Appl. No.: 11/355,083

(22) Filed: Feb. 16, 2006

(65) Prior Publication Data

US 2007/0188930 A1    Aug. 16, 2007

(51) Int. Cl.
*G11B 5/55* (2006.01)
(52) U.S. Cl. .................. 360/265; 360/264.8; 360/264.9
(58) Field of Classification Search .............. 360/264.7, 360/264.8, 264.9, 265, 265.8
See application file for complete search history.

(56) References Cited

U.S. PATENT DOCUMENTS

| | | | |
|---|---|---|---|
| 4,352,133 A * | 9/1982 | Hager | 360/266 |
| 4,490,635 A * | 12/1984 | Harrison et al. | 310/38 |
| 5,016,131 A * | 5/1991 | Riggle et al. | 360/264.7 |
| 5,247,410 A * | 9/1993 | Ebihara et al. | 360/264.9 |
| 5,448,437 A * | 9/1995 | Katahara | 360/265 |
| 5,625,515 A * | 4/1997 | Brown | 360/265 |
| 7,031,116 B2 * | 4/2006 | Subrahmanyan | 360/264.7 |
| 2002/0186498 A1* | 12/2002 | Sri-Jayantha et al. | 360/78.12 |
| 2005/0206781 A1* | 9/2005 | Sawada | 348/373 |
| 2006/0165251 A1* | 7/2006 | Bank | 381/414 |
| 2006/0275032 A1* | 12/2006 | Hong et al. | 396/439 |
| 2007/0159728 A1* | 7/2007 | Scura et al. | 360/264.9 |
| 2008/0165451 A1* | 7/2008 | Binnard et al. | 360/264.7 |

* cited by examiner

*Primary Examiner*—Jefferson Evans
(74) *Attorney, Agent, or Firm*—Nixon & Vanderhye P.C.

(57) ABSTRACT

A symmetric voice coil motor assembly having a central axis and including: a bearing assembly for rotation about the central axis; a coil assembly that is positioned radially outwardly from the bearing assembly and that has at least two pairs of coils and an inner yoke; a permanent magnet set that is positioned radially outwardly from the coil assembly and that includes at least two pairs of ring magnets and an outer yoke; and a head suspension assembly that is connected to the coil assembly and that includes a head gimbal assembly and an arm connected to the head gimbal assembly. The voice coil motor assembly may be a component in a hard disk drive, such as a micro drive.

21 Claims, 9 Drawing Sheets

SYMMETRIC VOICE COIL MOTOR DESIGN, ASSEMBLY METHODS OF CONSTRUCTING SAME, AND HARD DISK MICRO DRIVE STORAGE SYSTEMS INCLUDING SAME

FIELD OF THE INVENTION

The invention generally relates to data storage. Specifically, this invention relates to hard disk drives containing voice coil motor assemblies, methods of constructing a voice coil motor assemblies, and hard disk drives containing voice coil motor assemblies. More particularly, the instant invention is directed to symmetric-type voice coil motor assemblies for disk drive devices.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator typically makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator.

In a conventional disk drive unit, a magnetic disk is mounted on a spindle motor for spinning the disk. A voice coil motor arm carries a head gimbal assembly (HGA) that includes a micro-actuator with a slider incorporating a read/write head. A voice-coil motor (VCM) is provided for controlling the motion of the motor arm and, in turn, controlling the slider to move from track to track across the surface of the disk, thereby enabling the read/write head to read data from or write data to the disk. In operation, a lift force is generated by the aerodynamic interaction between the slider, incorporating the read/write transducer, and the spinning magnetic disk. The lift force is opposed by equal and opposite spring forces applied by a suspension of the HGA such that a predetermined flying height above the surface of the spinning disk is maintained over a full radial stroke of the motor arm.

Because of the inherent tolerances of the VCM and the head suspension assembly, the slider cannot achieve quick and fine position control which adversely impacts the ability of the read/write head to accurately read data from and write data to the disk. As a result, a PZT micro-actuator, as described above, is typically provided in order to improve the positional control of the slider and the read/write head. More particularly, the PZT micro-actuator corrects the displacement of the slider on a much smaller scale, as compared to the VCM, in order to compensate for the resonance tolerance of the VCM and/or head suspension assembly. The PZT micro-actuator enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator enables the disk drive device to have a significant increase in the surface recording density of the information storage disks used therein.

A hard disk drive, particularly a micro drive of the type to which the instant invention is directed, generally benefits from a compact size as well as a stable actuator. Many hard disk drives include only one coil in the voice coil motor (VCM) system, which may be enough to successfully operate. But with a single coil, it is difficult provide an advantageous relationship between the center of gravity and the center of force. Moreover, using an asymmetrical method of driving forces, the device may be unstable and unsuitable for high speed periodic rotation applications, such as in magnetic and/or magnetic/optical disk drive devices.

In the data storage field, the coil mass is generally used to offset the head arm mass to assist in balancing the actuator. Thus, the coil mass is typically asymmetrical. Thus, in high-end products, it is not uncommon to add a second actuator (such as the PZT micro-actuator described above) in the hard disk drive in order to minimize the frequency of off-track errors.

A prior art hard disk drive (HDD) typically contains an actuator for positioning the magnetic head over the upper and lower surfaces of the disk and for carrying the rotating arm back and forth (thus facilitating reading data from and writing data to the magnetic hard disk). There are generally two categories of voice coil motor designs: moving coil (MC) and moving magnet (MM). Of these two types, the moving magnet (MM) design is generally more prevalent in hard disk drives available on the market today.

FIG. 1 depicts a typical prior art micro drive incorporating a moving coil (MC)-type voice coil motor (VCM) as the primary actuator. In the disk drive device of FIG. 1, there are three basic components of the voice coil motor (VCM): a magnet 1, a yoke 2, and a movable coil 3. The movable coil 3 can be excited by a driving current. When the movable coil 3 is excited, arm 7 and head gimbal assembly 6 are rotated around shaft 8 which is fixed relative to base 10. As a result of a potential dynamic balance effect and possible eccentricity of spindle motor 9, the magnetic head 4 may, for example, be required to adjust its position in order to correctly read data from or correctly write data to an oscillating or fluctuating disk 5.

FIG. 2 illustrates a conventional hard disk drive—in particular, a micro drive—of the moving magnet (MM)-type. In the device of FIG. 2, magnet 1' and yoke 2' are movable, and the coil assembly 3' is fixed to base 10. In such as device, the assembly process may be simplified by changing the coil type from a winding formation to an integrated flex loop 3'. Based on the Faraday principle, a Lorentz force can be generated by the energized coils and permanent magnets. If the coils are constrained and fixed on base 10, the interactive force will make the magnets move and rotate around shaft 8 together with arm 7 and head gimbal assembly 6. The magnetic head 4 can thus be operated by servo control to adjust its relative position on disk 5. Accordingly, a symmetric VCM structure is similar to the structure of the spindle motor 9. Although the MM-type VCM may have advantages relating to size reduction and low-cost, there may be a risk of magnet contamination, which is not welcome among manufacturers of disk drive devices.

In a conventional system, a MM-type VCM generally requires a smaller footprint in a hard disk drive (HDD) than a MC-type. In general terms, both a MM-type and a MC-type VCM will use a pair of driving forces to generate a relative rotation. As the size of a hard disk drive decreases, it becomes more difficult to employ a symmetric design for the VCM. Thus, while symmetric designs have been developed, they have not been widely adopted in the industry due, at least in part, to the various problems discussed herein.

FIG. 3 illustrates a conventional MC-type VCM.

In addition to magnet 1 and bottom yoke 2a, the VCM contains a top yoke 2b, which may assist in increasing the magnetic flux density. Normally, there are two air gaps in a MC-type VCM. One exists between magnet 1 and coil 3, while the other exists between coil 3 and top yoke 2b. In a MM-type VCM, however, there is generally only one air gap. The present invention can assist in minimizing the air gap(s) in voice coil motor assemblies.

Although a MM-type VCM may be compact, thin and inexpensive, they typically are heavier in weight. This heavy weight can cause the moment of inertia to be greater than with the traditional MC-type VCM. In addition, if there is permeable material under the integrated flex loop, the interactive force applied on the magnet may result in a great deal of friction. Friction, in turn, may cause a MM-type VCM to operate more slowly than a MC-type VCM.

The use of an asymmetric driving method, furthermore, is not preferable. Some designers, for example, prefer to have a symmetric layout in a VCM assembly. However, under presently known VCM designs, its is difficult to introduce an additional coil in the VCM assembly. Although some symmetric designs have been proposed, they do not overcome problems relating to counterforces and also have not been compact and efficient enough for widespread implementation.

The instant invention is intended to solve one or more of the above-described problems with prior art VCM designs, and to provide a symmetric and more compact VCM design, which is particularly useful in a micro drive.

BRIEF SUMMARY OF THE INVENTION

One aspect of the instant invention is to provide an improved voice coil motor (VCM) design.

Another aspect of the instant invention is to provide an improved VCM design that achieves better dynamic performance as compared to prior art designs.

A further aspect of the invention is to provide a symmetric-type VCM design that is compact and efficient, and overcomes problems with prior symmetric designs.

Another aspect of the invention is to provide a unique symmetric, moving coil (MC)-type VCM design for microdrives.

A further aspect of the invention is to provide an improved symmetric-type VCM design that minimizes air gaps and provides increased flux density.

Another aspect of the invention is to provide an improved VCM design that minimizes coil bending and torsion and, as a result, reduces vibration.

still another aspect of the invention is to provide a VCM design having more coils as compared to prior designs, while also having a spatial structure that is relatively more compact.

Another aspect of the instant invention is to provide an improved disk drive device for high capacity, small size and low cost applications.

In accordance with an exemplary embodiment of the present invention, a voice coil motor assembly is provided that has a central axis and comprises: a bearing assembly for rotation about the central axis; a coil assembly that is positioned radially outwardly from the bearing assembly and that comprises at least two pairs of coils and an inner yoke; a permanent magnet set that is positioned radially outwardly from the coil assembly and that comprises at least two pairs of ring magnets and an outer yoke; and a head suspension assembly that is connected to the coil assembly and that comprises a head gimbal assembly and an arm connected to the head gimbal assembly.

In accordance with another exemplary embodiment of the present invention, a hard disk drive system is provided that includes: a base for affixing components of the hard disk drive system; a hard disk for data storage; a voice coil motor assembly having a central axis and comprising: a bearing assembly for rotation about the central axis; a coil assembly that is positioned radially outwardly from the bearing assembly and that comprises at least two pairs of coils and an inner yoke; a permanent magnet set that is positioned radially outwardly from the coil assembly and that comprises at least two pairs of ring magnets and an outer yoke; and a head suspension assembly that is connected to the coil assembly and that comprises a head gimbal assembly and an arm connected to the head gimbal assembly; and a spindle motor for rotating the hard disk.

In accordance with another exemplary embodiment of the present invention, a method of constructing a cylindrical voice coil motor assembly having a central axis is provided. The method comprises the steps of: constructing a head suspension assembly comprising a head gimbal assembly and an arm by connecting the arm to the head gimbal assembly; constructing a coil assembly comprising at least two pairs of coils and an inner yoke, wherein the coil assembly has an outer circumference formed by the at least two pairs of coils, a radius measured from the central axis to the outer circumference formed by the at least two pairs of coils, an inner circumference formed by the inner yolk, and a radius measured from the central axis to the inner circumference formed by the inner yolk; constructing a permanent magnet set comprising at least two pairs of ring magnets and an outer yoke, wherein the permanent magnet set has an inner circumference formed by the at least two pairs of ring magnets and a radius measured from the central axis to the inner circumference, wherein the radius measured from the central axis to the inner circumference of the at least two pairs of ring magnets is greater than the radius measured from the central axis to the outer circumference formed by the at least two pairs of coils; constructing a top and bottom bearing assembly, wherein the top and bottom bearing assembly has an outer circumference and a radius measured from the central axis to the outer circumference, wherein the radius measured from the central axis to the outer circumference of the bearing assembly is less than the radius measured from the central axis to the radius measured from the central axis to the inner circumference of the coil assembly formed by the inner yolk; connecting the head suspension assembly to the coil assembly; inserting the coil assembly into an area formed by the inner circumference of the permanent magnet set formed by the at least two pairs of ring magnets; and inserting the top and bottom bearing assembly into an area formed by the inner circumference of the coil assembly formed by the inner yolk. These method steps may be performed in any suitable order.

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION OF THE INVENTION

Figure 1:
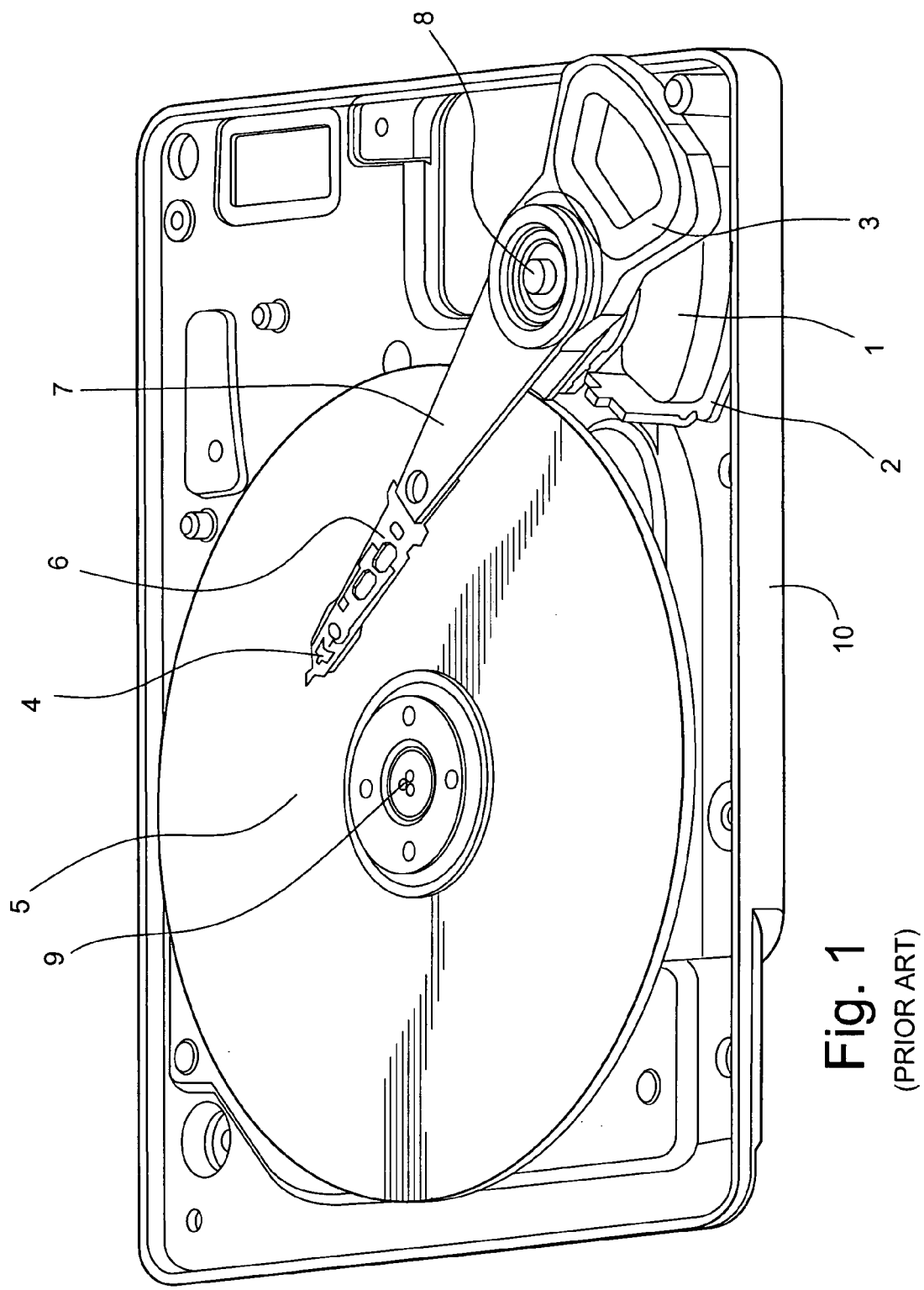
FIG. 1 illustrates a conventional moving coil (MC) type micro drive.
Figure 2:
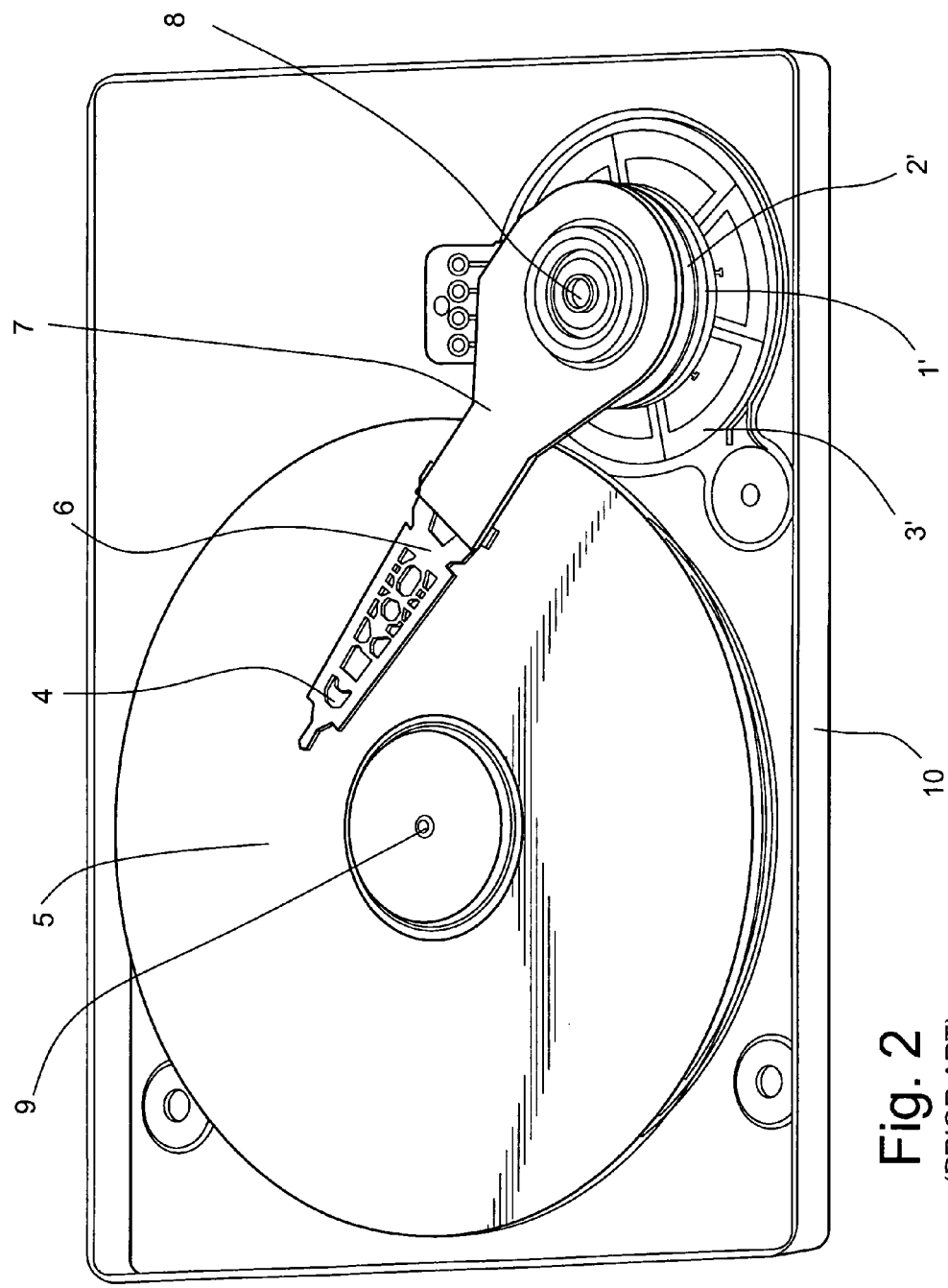
FIG. 2 illustrates a prior art moving magnet (MM) type micro drive having a symmetrical design.
Figure 3:
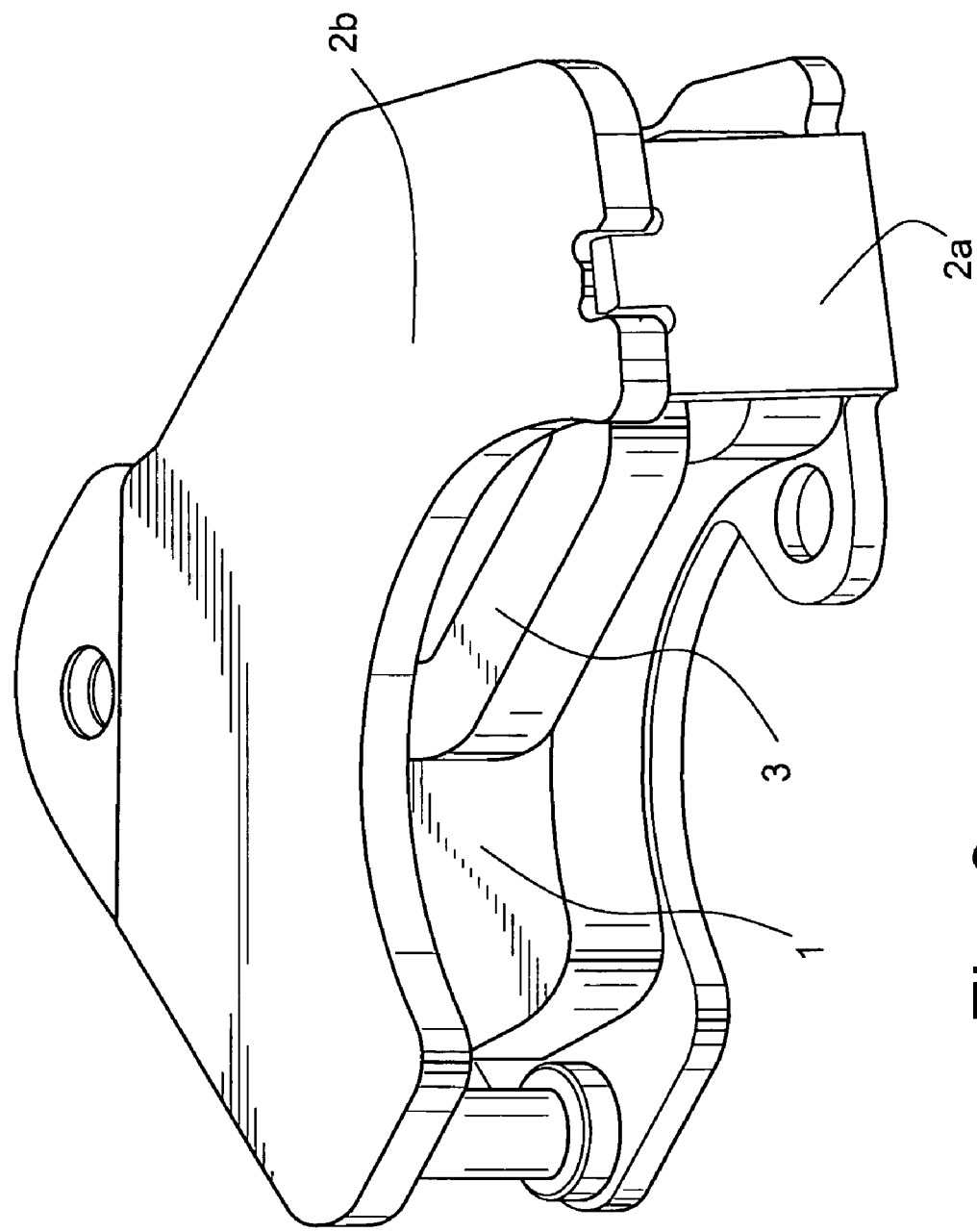
FIG. 3 illustrates a traditional voice coil motor layout as used in the device of FIG. 1.

The preferred embodiments of the instant invention will now be described with reference to FIGS. 4-9, wherein like reference numerals designate similar parts throughout the various views. As indicated above, the instant invention is designed to provide an improved voice coil motor (VCM) assembly for a micro drive having a symmetric configuration.

It is noted that the voice coil motor of the invention may be implemented in any suitable disk drive device requiring an actuator in which it is desired to improve, for example, head control and resonance performance, regardless of the specific structure of, for example, the HGA and other parts of the disk drive device.

That is, the invention is not limited to the specific structures shown and described herein and, instead, may be used in any suitable micro drive in any industry. However, one benefit of the instant invention is that it can, if desired, be implemented in a disk drive device without the need to make significant modifications to the HGA or other primary parts of the device as used in the prior art and shown, for example, in FIG. 1.

Figure 4:
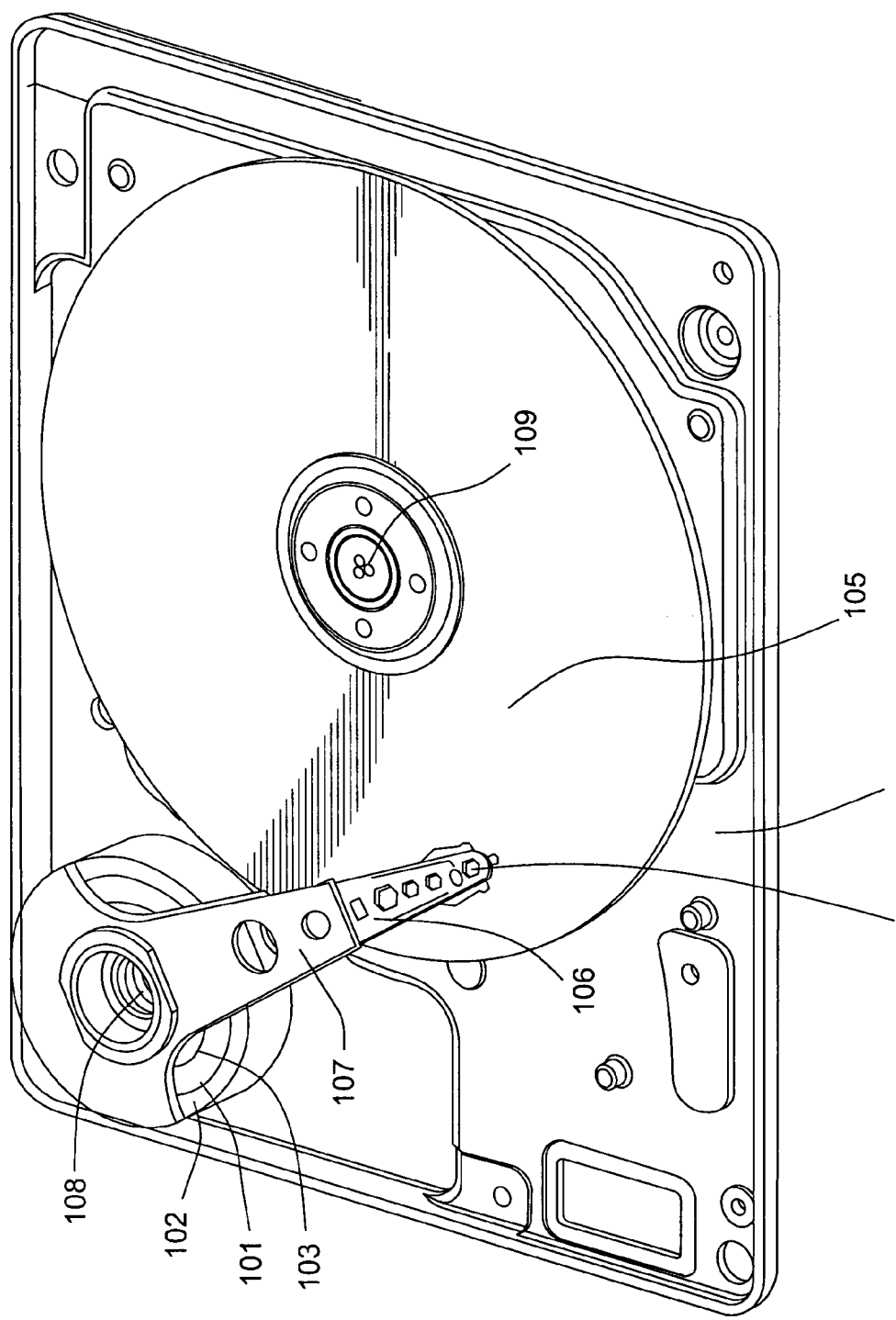
FIG. 4 illustrates an exemplary embodiment of a symmetric moving coil (MC) type micro drive of the present invention.

FIG. 4 shows a preferred embodiment of the instant invention. FIG. 4 illustrates a hard disk drive—specifically, a micro drive—including a MC-type VCM in accordance with an exemplary embodiment of the invention. The layout of this disk drive is generally similar to a conventional disk drive's layout, except that the VCM has been modified to provide a symmetric configuration in order to improve the operation thereof. In other words, the layout of certain components, such as the head gimbal assembly (HGA) 106, arm 107 and base 110 are, in this exemplary embodiment, similar to the conventional disk drive's layout. The disk drive depicted in FIG. 4 also contains a magnetic head 104, disk 105, and spindle motor 109, like those in a conventional disk drive. The VCM layout illustrated in FIG. 4 is not only symmetric but also enables the device to have a smaller footprint relative to prior devices.

Figure 5:
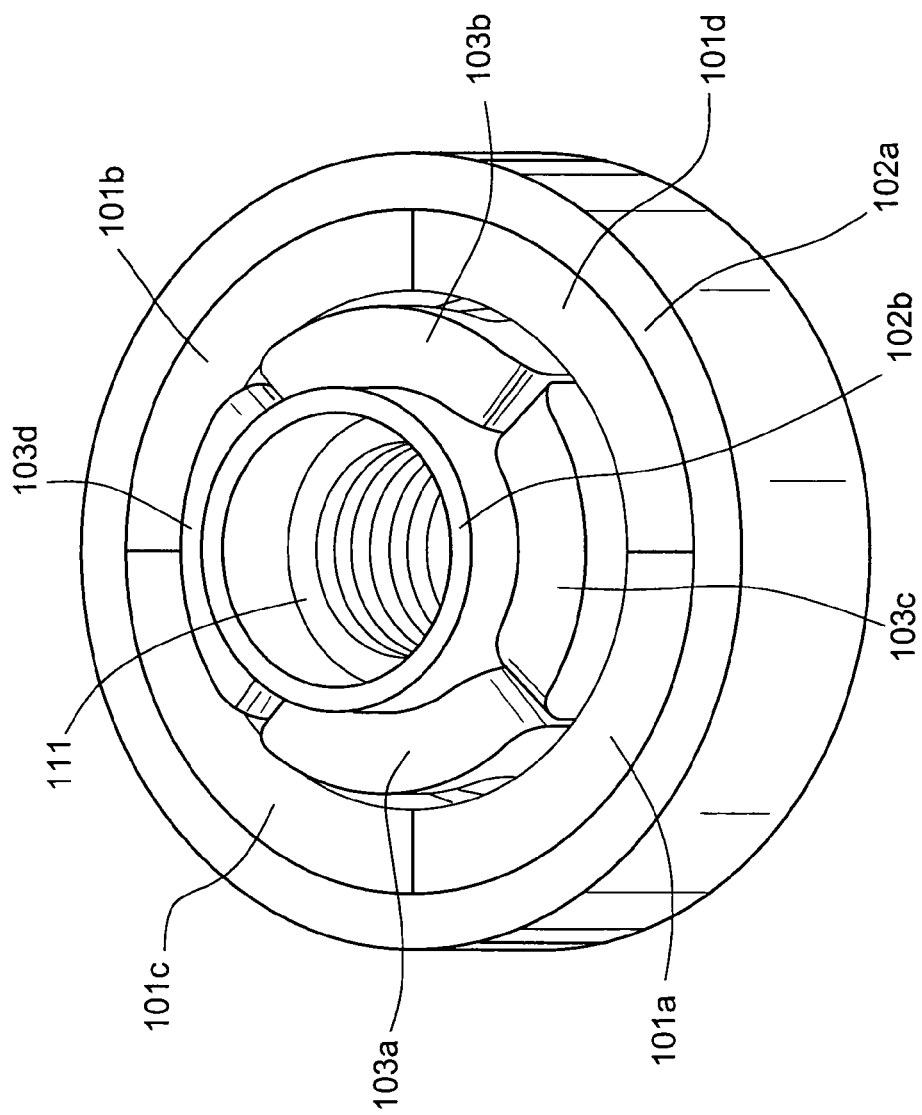
FIG. 5 illustrates an exemplary embodiment of the voice coil motor design of the present invention and as shown in the micro drive of FIG. 4

In a small hard disk drive (such as a micro drive), there is typically very little room for even one additional coil. However, in accordance with the instant invention, several additional coils are introduced in an advantageous and effective manner to improve the operation thereof. As shown in FIG. 5, four coils (103a, 103b, 103c & 103d) are provided in a configuration that surrounds the VCM's bearing device 111. The bearing device 111 permits rotation about a central axis.

FIG. 5 also illustrates two pairs of magnets that are arranged inside outer yoke 102a. Ring magnets 101a & 101b each have a north pole on their inner radial surface, while ring magnets 101c & 101d each have a south pole on their inner radial surface. It is noted that although two pairs of both ring magnets and coils are shown in this embodiment, other numbers (such as, for example, one, three or more) of ring magnet and coil pairs may be used.

In this embodiment, each coil 103a-103d is affected by its two adjacent ring magnets, one having a north pole on its inner radial surface, and the other having a south pole on its inner radial surface. The VCM generates Lorentz forces from the movable, energizable coils and the fixed, permanent magnets. Because all of these coils and magnets are symmetric around the rotary shaft 8, counterforces are be minimized, and a pure rotation at the center of gravity is achieved, thereby enhancing the operation of the device.

In addition to outer yoke 102a, inner yoke 102b is also used to increase the magnetic flux density for coils 103a-103d. Due to the symmetric design and the resulting balancing of the interactive forces between the inner yoke and magnets, the bearing system operates smoothly and efficiently. Furthermore, the coils can be assembled together with the inner yoke, thus minimizing the air gap between the coils and inner yoke. Minimizing the air gap between the coils and inner yoke, in turn, makes actuator more compact and space-efficient. Furthermore, placing the coils close to the inner yoke increases the rigidity of the coils, thereby minimizing bending and torsion of the coils during operation and, as a result, also minimizing vibration in the device.

Figure 6:
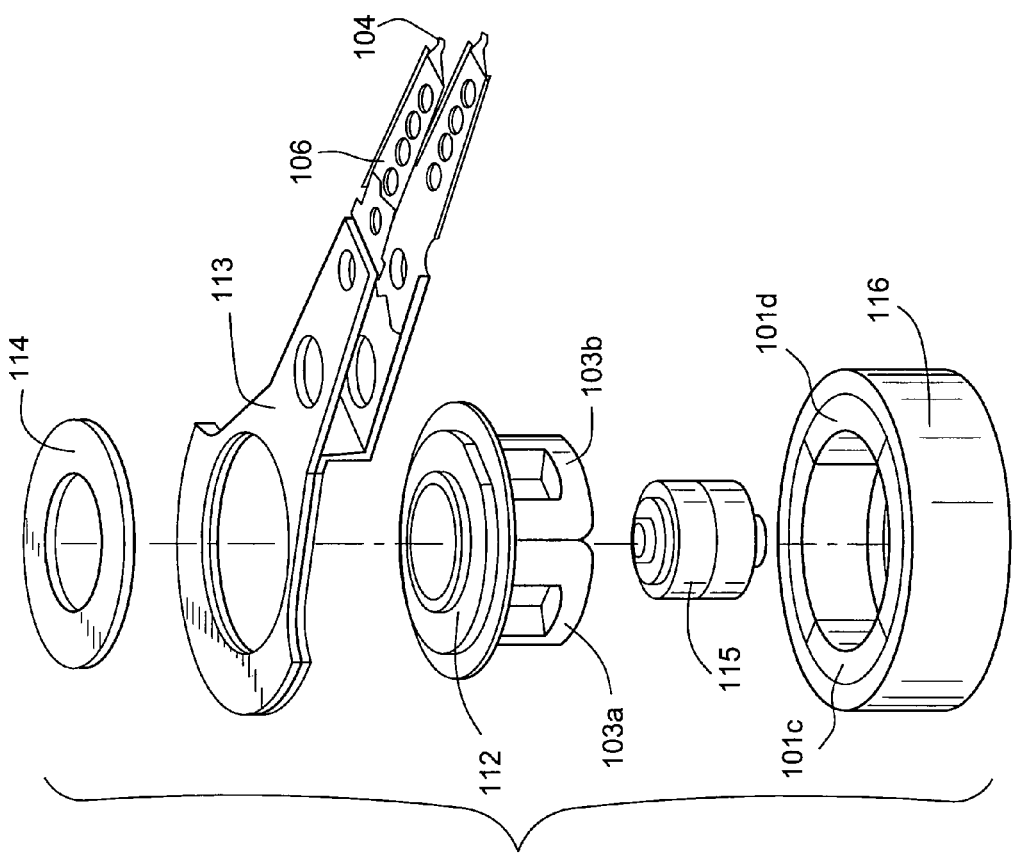
FIG. 6 provides an exploded view of the actuator incorporating the voice coil motor of FIG. 5, in accordance with a preferred embodiment.

FIG. 6 depicts an exploded view of the actuator (and thus also depicts the various unassembled portions of the actuator and the general assembly method thereof) in accordance with the exemplary embodiment of FIG. 5. The actuator of this embodiment comprises two head assemblies 106 and two heads 104, one for the upper surface of the hard disk and another for the lower surface. The actuator arms are typically machine-formed from a single block of metal, such as aluminum or magnesium, into an "E-block" shape. However, any suitable method of manufacture can be used. The arms of the E-block are joined with their head gimbal assemblies (HGAS) by stacking all of the HGAs to their respective arms to form a head stack assembly (HSA) 113.

Figure 7:
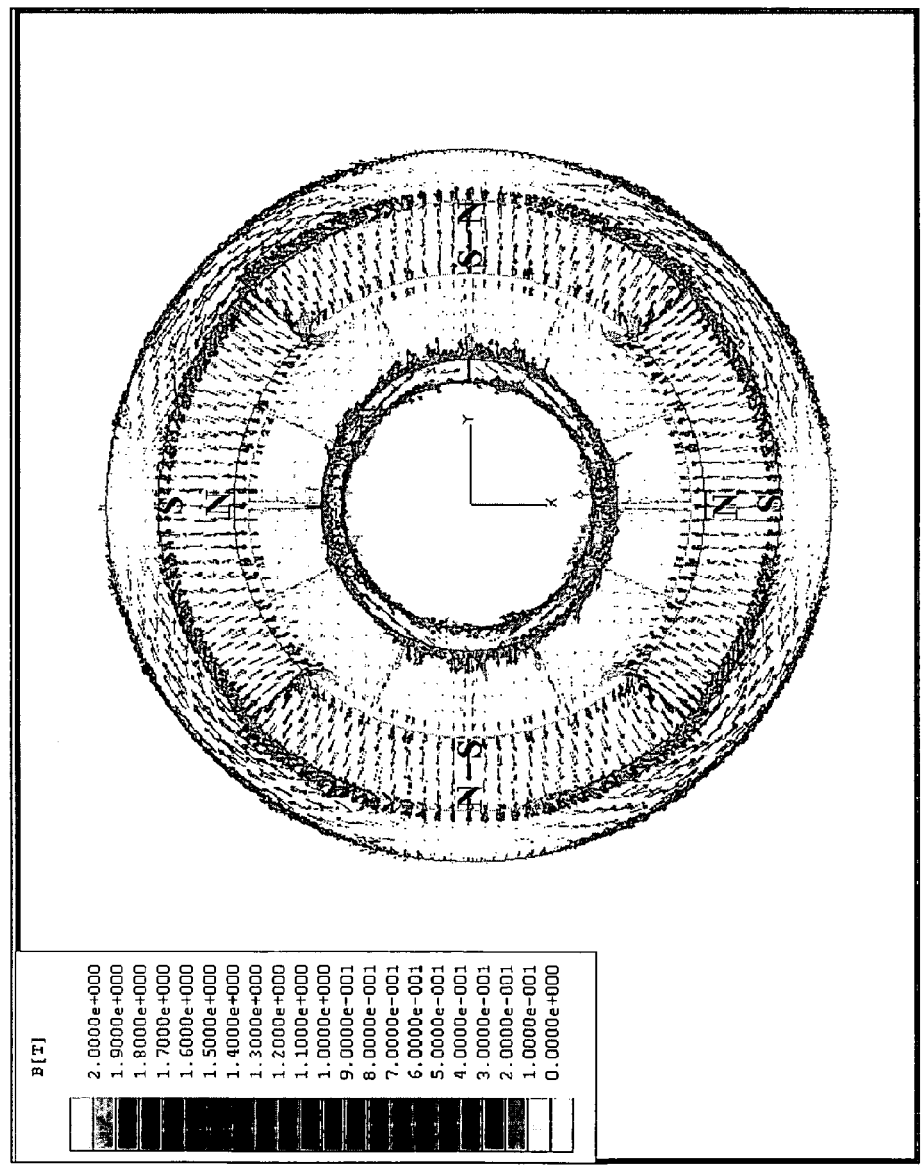
FIG. 7 shows the flux density of the exemplary voice coil motor of FIG. 5.
Figure 8:
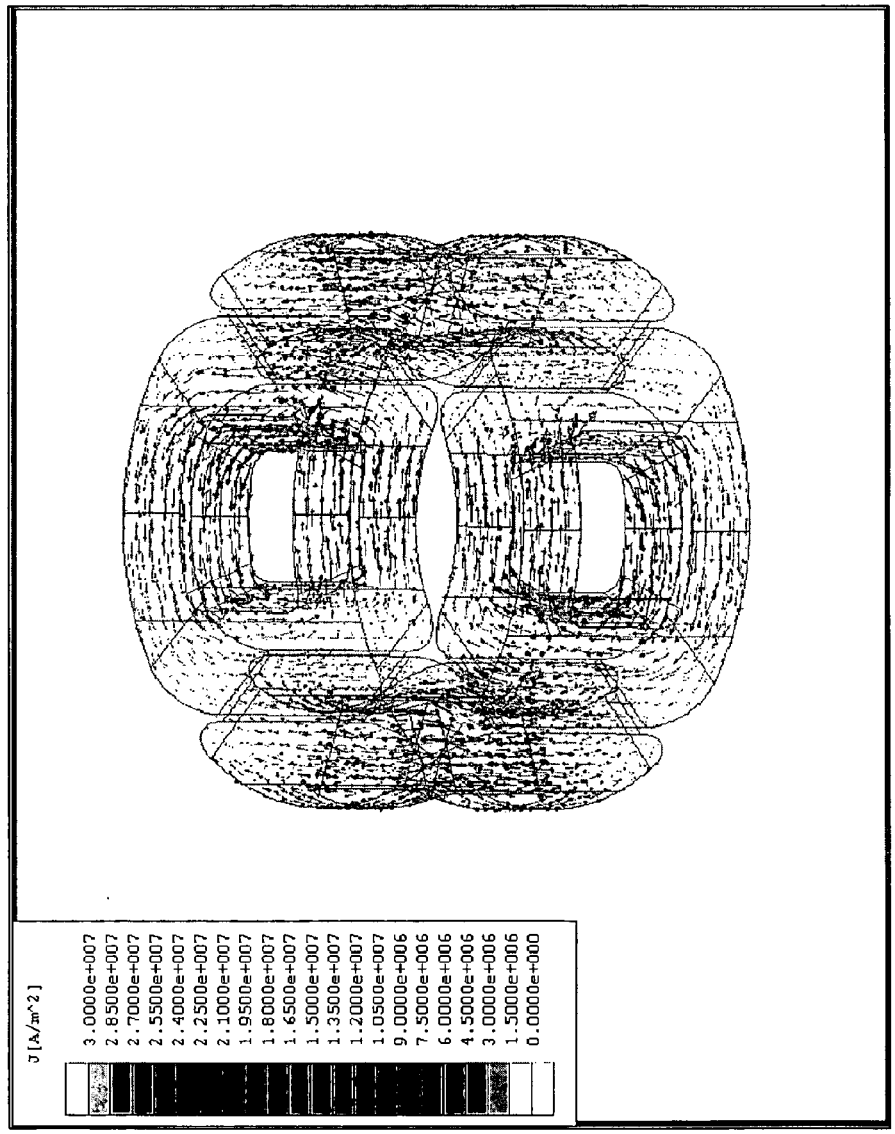
FIG. 8 shows the current density of the exemplary voice coil motor of FIG. 5.
Figure 9:
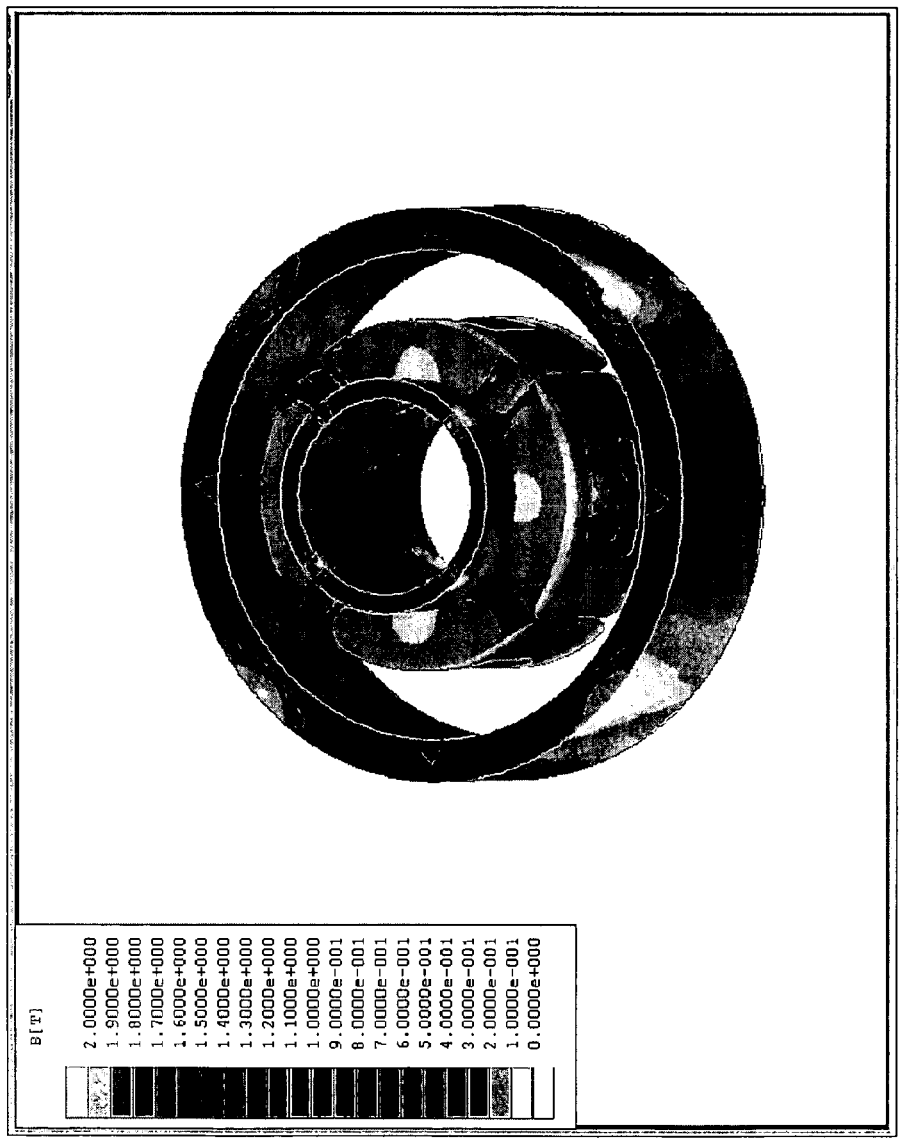
FIG. 9 shows a contour plot of the coils and yokes in the exemplary voice coil motor of FIG. 5.

The cylindrical body of coil assembly 112 has a central axial bore for receiving a top and bottom bearing assembly 115. The four symmetric coils (103a-103d) can be combined in the coil assembly 112 to form a subassembly. The HSA 113 is connected to the coil assembly 112 by a nut 114 or other connection. The HSA 113 need not be in direct contact with the coil assembly 112 to be connected. Indeed, the specific connection is not critical and can vary depending on the particular application in which the invention is employed. After the HSA is connected to the coil assembly by nut 114, the bearing assembly 115 or pivot can be installed therein. At this point the moving parts of the actuator have been assembled. To minimize the risk of magnet contamination, the stationary permanent magnet set 116 (including ring magnets 101a-101d and outer yoke 102a) can be assembled separately. As can be seen from FIGS. 5 and 6, the voice coil motor (comprising coil assembly 112, bearing assembly 115 and magnet set 116) is, when assembled, symmetric about the central axis defined through the bearing assembly 115. The actuator is then ready to be assembled into a drive unit and operatively connected to a servo control system (not shown) for controllably moving the heads across the surfaces of the disk 105 rotated by spindle motor 109 for reading data from and writing data to the disk FIG. 7 shows a vector plot of magnetic flux density for the embodiment of the VCM system of FIG. 5. Based on the current density shown in FIG. 8, the total driving force can be calculated by computer simulation. FIG. 9 shows a contour plot of the coils and yokes. Figures such as FIG. 9 are helpful in designing VCMs within the scope of the present invention. Furthermore, commercial software, such as ANSOFT, may be useful in designing a VCM and a hard disk drive system containing a symmetric VCM in accordance with the teachings herein. In addition, based on the fundamental Faraday principle in magnetics, the Lorentz force can be calculated by the finite element method when designing a symmetric VCM in accordance with the invention.

Table 1 below lists numerical differences between a prior art VCM design (as shown, for example, in FIG. 1) and the exemplary embodiment of the invention described above:

TABLE 1

|  | Existing Design | Exemplary Embodiment |
|---|---|---|
| Coil Inner Diameter (mm) | 0.06 | 0.08 |
| Formation of coil | 12 × 11 | 10 × 9 |
| Layers of coil | 16 | 10 |
| Total Resistance (ohm) | 23.43 | 16.08 |
| Air Gap (mm) | 0.40 | 0.20 |

TABLE 1-continued

|  | Existing Design | Exemplary Embodiment |
|---|---|---|
| Average Flux Density Through Coil (Tesla) | 0.50 | 0.60 |
| Total Driving Force (mN) | 87 | 114 |

The above table demonstrates, for example, that an increase of around 20% in the flux density can be achieved by the smaller air gap (0.2 mm) provided by the instant invention. The table also shows that the total driving force is around 114 mN, which is greater than original value of 87 mN for prior designs. Thus, within the existing platform, better and more efficient performance is achieved by the symmetric VCM actuator of the invention.

As can be seen from the above-described preferred embodiment, the invention provides, among other things: 1) a drive with less volumetric size than a conventional micro drive (for example, the VCM disclosed herein may be smaller by 30%); 2) more stable actuator by using a symmetric VCM; 3) higher flux density by minimizing the air gap in magnetic field; and 4) minimized vibration from the coil's bending and torsion modes. All of these benefits result in an improved VCM device as compared to the prior designs.

The physical size of hard disk drives, such as micro drives, is generally decreasing as time passes. As the physical size decreases, the dynamic performance must also improve and the actuator must become more efficient. The symmetric VCM disclosed herein provides a convenient and economical solution to utilizing the space available in a micro drive. While there have been preexisting MM-type VCMs with a symmetric configuration, they have had very different configurations and operation characteristics and have not provided the benefits achieved by the instant invention as explained herein. Moreover, unlike the embodiment described herein, many currently marketed hard disk drive (HDD) products use an asymmetric MC-type VCM. In contrast, the preferred embodiment herein provides an improved MC-type VCM having a symmetric configuration that can be used for a variety of actuated devices, such as a traditional rotary DVD pick-up heads and the like. Not only is the VCM assembly of the invention generally symmetric, but it also provides a smaller air gap when compared to conventional VCM assemblies. Moreover, even though the VCM of the invention contains additional coils (when compared to a conventional VCM assembly), the overall spatial structure can be substantially more compact than conventional hard disk drive systems (including micro drive systems). Thus, the invention can, for example, provide a solution for high capacity, small size and low cost disk drives. Furthermore, the dynamic performance is improved by the symmetric VCM.

Generally speaking, the sensitivity of the actuator is a function of the driving force of the VCM and the weight of moving parts. Inside a micro drive, the design of the VCM is primarily restricted by the size of disk. Placing a symmetric VCM into a compact space is a challenge, even in a relatively simple single actuator control system. The instant invention helps to overcome this space challenge.

Generally, only one coil may be required to generate one-axial control in an actuator. But a center of the force that is not concurrent with center of gravity may have detrimental consequences, such as vibration, the severity of which depends on the particular application. If the servo system for the actuator cannot control the resultant vibration, a second actuator may be required. A second actuator, however, increases costs and may not be an uneconomical solution. The instant invention provides a more effective and efficient actuator by using a symmetric design having a plurality of coils, and can reduce or even possibly eliminate the need for a second actuator in disk drive devices.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A voice coil motor assembly having a central axis comprising:
   (a) a bearing assembly for rotation about the central axis;
   (b) a coil assembly that is positioned radially outwardly from the bearing assembly and that comprises (i) at least two pairs of coils and (ii) an inner yoke, wherein the coils are assembled together with the inner yoke so that the coils and the inner yoke can rotate together; and
   (c) a permanent magnet set that is positioned radially outwardly from the coil assembly and that comprises (i) at least two pairs of ring magnets and (ii) an outer yoke,
   wherein the coil assembly further comprises an air gap between the at least two pairs of coil and the inner yoke, and
   wherein the air gap is less than 0.4 mm.

2. The voice coil motor assembly of claim 1, further comprising a head suspension assembly that is connected to the coil assembly and that comprises (i) a head gimbal assembly and (ii) an arm connected to the head gimbal assembly.

3. The voice coil motor assembly of claim 2, further comprising a nut that connects the head suspension assembly to the coil assembly.

4. The voice coil motor assembly of claim 2, further comprising at least three pairs of coils and three pairs of ring magnets.

5. The voice coil motor assembly of claim 1, wherein each ring magnet has an inner radial surface having a north or south polarity, and wherein adjacent ring magnets do not have the same polarity.

6. The voice coil motor assembly of claim 1, wherein a magnetic flux passes through the coil assembly when the coils are excited by a current.

7. The voice coil motor assembly of claim 6, wherein the magnetic flux has a flux density through the coil assembly of greater than 0.5 Tesla.

8. The voice coil motor assembly of claim 1, further having a total driving force of greater than 90 mN.

9. The voice coil motor assembly of claim 1, wherein the number of coils equals a number of ring magnets.

10. The voice coil motor assembly of claim 1, wherein each coil has a centerline orthogonal to the central axis and is arcuate about the central axis.

11. The voice coil motor assembly of claim 1, wherein the coils are symmetric about the central axis.

12. The voice coil motor assembly of claim 1, wherein the ring magnets are symmetric about the central axis.

13. The voice coil motor assembly of claim 1, wherein the coils and the ring magnets are positioned symmetrically around the central axis.

14. A hard disk drive system comprising:
   (a) a base for affixing components of the hard disk drive system;
   (b) a hard disk for data storage;
   (c) a voice coil motor assembly having a central axis and comprising:
      (i) a bearing assembly for rotation about the central axis;
      (ii) a coil assembly that is positioned radially outwardly from the bearing assembly and that comprises (A) at least two pairs of coils and (B) an inner yoke, wherein the coils are assembled together with the inner yoke so that the coils and the inner yoke can rotate together; and
      (iii) a permanent magnet set that is positioned radially outwardly from the coil assembly and (A) at least two pairs of ring magnets and (B) an outer yoke; and
      (iv) a head suspension assembly that is connected to the coil assembly and that comprises (A) a head gimbal assembly and (B) an arm connected to the head gimbal assembly; and
   (d) a spindle motor for rotating the hard disk,
   wherein the coil assembly further comprises an air gap between the at least two pairs of coil and the inner yoke, and
   wherein the air gap is less than 0.4 mm.

15. The hard disk drive system of claim 14, wherein the hard disk drive is a micro drive.

16. The hard disk drive system of claim 14, wherein the voice coil motor assembly comprises at least three pairs of coils and at least three pairs of ring magnets.

17. The hard disk drive system of claim 14, wherein each coil has a centerline orthogonal to the central axis and is arcuate about the central axis.

18. The hard disk drive system of claim 14, wherein the coils are symmetric about the central axis.

19. The hard disk drive system of claim 14, wherein the ring magnets are symmetric about the central axis.

20. The hard disk drive system of claim 14, wherein the coils and the ring magnets are positioned symmetrically around the central axis.

21. A method of constructing a cylindrical voice coil motor assembly having a central axis, the method comprising the steps of:
   (a) constructing a head suspension assembly comprising (i) a head gimbal assembly and (ii) an arm by connecting the arm to the head gimbal assembly;
   (b) constructing a coil assembly comprising (i) at least two pairs of coils and (ii) an inner yoke, wherein the coil assembly has an outer circumference formed by the at least two pairs of coils, a radius measured from the central axis to the outer circumference formed by the at least two pairs of coils, an inner circumference formed by the inner yoke, and a radius measured from the central axis to the inner circumference formed by the inner yoke, wherein the coil assembly further comprises an air gap between the at least two pairs of coil and the inner yoke, and wherein the air gap is less than 0.4 mm;
   (c) constructing a permanent magnet set comprising (i) at least one pair of ring magnets and (ii) an outer yoke, and wherein the permanent magnet set has an inner circumference formed by the at least two pairs of ring magnets and a radius measured from the central axis to the inner circumference, wherein the radius measured from the central axis to the inner circumference of the at least two pairs of ring magnets is greater than the radius measured from the central axis to the outer circumference formed by the at least two pairs of coils;

(d) constructing a top and bottom bearing assembly, wherein the top and bottom bearing assembly has an outer circumference and a radius measured from the central axis to the outer circumference, wherein the radius measured from the central axis to the outer circumference of the bearing assembly is less than the radius measured from the central axis to the radius measured from the central axis to the inner circumference of the coil assembly formed by the inner yoke;

(e) connecting the head suspension assembly to the coil assembly;

(f) inserting the coil assembly into an area formed by the inner circumference of the permanent magnet set formed by the at least one pair of ring magnets; and (g) inserting the top and bottom bearing assembly into an area formed by the inner circumference of the coil assembly formed by the inner yoke;

wherein the coils are assembled together with the inner yoke so that the coils and the inner yoke can rotate together.

* * * * *